United States Patent
Feng et al.

(10) Patent No.: US 7,172,742 B2
(45) Date of Patent: Feb. 6, 2007

(54) METHOD OF PREPARING WET PROCESS PHOSPHORIC ACID

(75) Inventors: Yisheng Feng, Shandong (CN); Jiutian Feng, Shandong (CN); Xigang Liu, Shandong (CN); Yurui Wang, Shandong (CN); Tianbao Lu, Shandong (CN)

(73) Assignee: Shandong Lubei Enterprise Group Company (CN)

( * ) Notice: Subject to any disclaimer, the term of this patent is extended or adjusted under 35 U.S.C. 154(b) by 259 days.

(21) Appl. No.: 10/362,845

(22) PCT Filed: May 15, 2001

(86) PCT No.: PCT/CN01/00796
§ 371 (c)(1),
(2), (4) Date: Jul. 18, 2003

(87) PCT Pub. No.: WO02/20400
PCT Pub. Date: Mar. 14, 2002

(65) Prior Publication Data
US 2004/0047790 A1      Mar. 11, 2004

(30) Foreign Application Priority Data
Sep. 1, 2000   (CN) ............................. 00 1 11330

(51) Int. Cl.
C01B 25/222     (2006.01)
C01B 25/231     (2006.01)

(52) U.S. Cl. .................................. 423/320; 423/157.4

(58) Field of Classification Search ............. 423/157.4, 423/320
See application file for complete search history.

(56) References Cited

U.S. PATENT DOCUMENTS

| | | | |
|---|---|---|---|
| 3,416,887 A | | 12/1968 | Matsubara et al. |
| 3,552,918 A | * | 1/1971 | Fitch et al. ................. 423/166 |
| 3,653,826 A | * | 4/1972 | Ishihara et al. ............. 423/320 |
| 4,059,674 A | * | 11/1977 | Lopker ..................... 423/157.4 |
| 4,777,027 A | * | 10/1988 | Davister et al. ............ 423/320 |

FOREIGN PATENT DOCUMENTS

| | | |
|---|---|---|
| CN | 1043521 | 7/1990 |
| JP | 57129811 | 8/1982 |
| RU | 2094365 | 10/1997 |

* cited by examiner

*Primary Examiner*—Wayne A. Langel
(74) *Attorney, Agent, or Firm*—Lackenbach Siegel LLP

(57) ABSTRACT

The present invention relates to a method of preparing wet process phosphoric acid, which comprises: dividing raw materials which contain phosphate rock slurry and sulfuric acid into two parts, and then feeding these two parts into two reactors separately. In the first reactor, feeding 70–90 wt. % of the total amount of the slurry and sulfuric acid, in which the ratio of phosphate rock slurry to sulfuric acid to recycled phosphoric acid is set to be 1:0.6~0.8:1.0~2.5. 10~30% of the reaction solution directly flows into conversion cell, participating in the conversion reaction of dihydrate gypsum. Thus resulted phosphoric acid concentration is 33~39 wt. %. The recovery efficiency of $P_2O_5$ is 99% or more. When putting coke powders in the conversion solution as filter aid, the filtration efficiency can be improved by 10~30%, and in so produced hemihydrate gypsum, $P_2O_5$ is 0.05~0.2%, water of hydration is 4~8%. The product can be used for producing sulfuric acid and cement without baking dry.

8 Claims, 1 Drawing Sheet

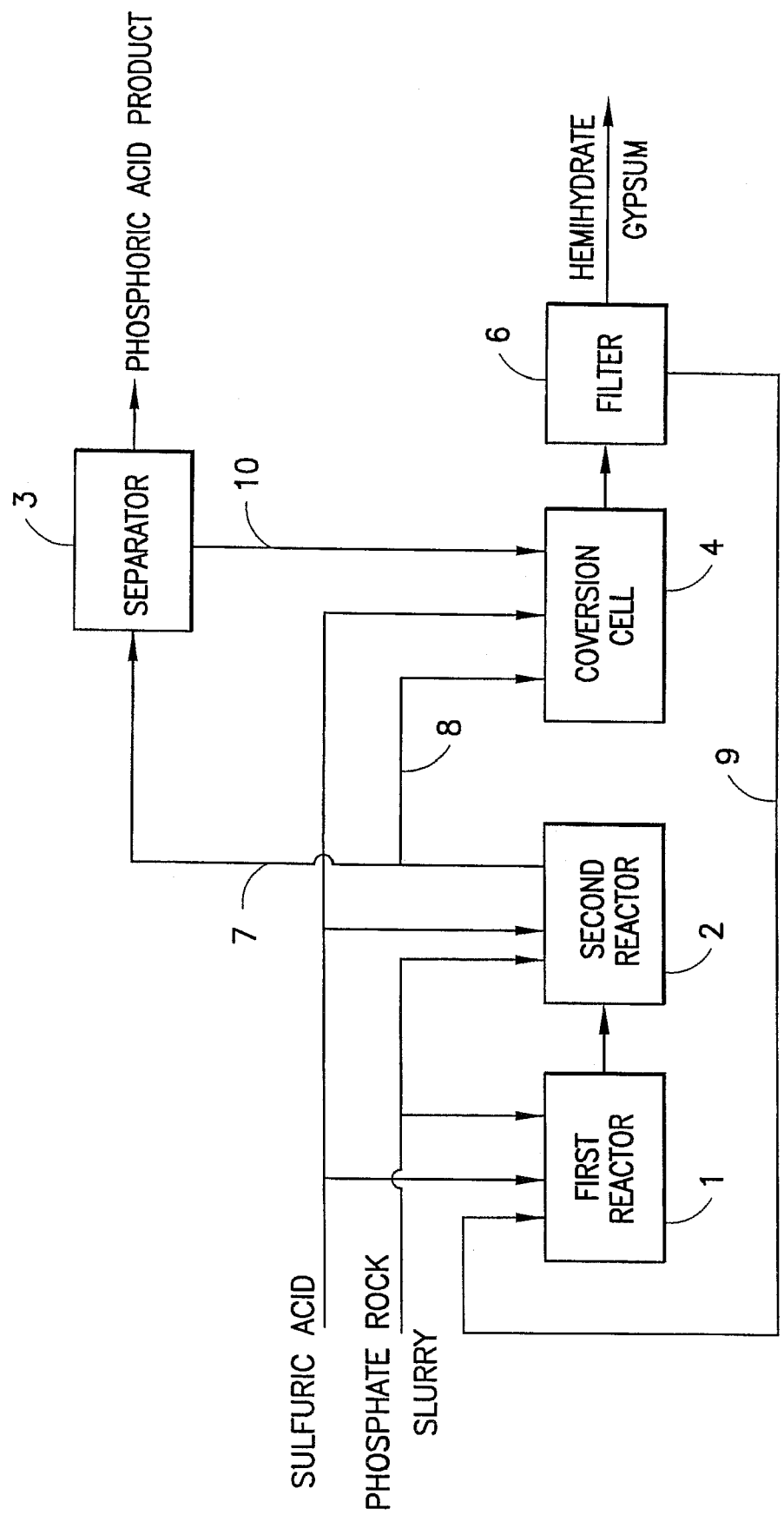
FIGURE

METHOD OF PREPARING WET PROCESS PHOSPHORIC ACID

TECHNICAL FIELD

The present invention relates to the field of preparing process phosphoric acid. More particularly, the invention relates to an improved method of preparing wet process phosphoric acid.

BACKGROUND ART

The phosphoric acid is one of the important chemical materials. The processes for preparing phosphoric acid are classified as wet-process and heat-process. Typical wet-process for preparing phosphoric acid is comprising: decomposing phosphate rock with sulfuric acid and separating the resulted phosphate rock slurry into phosphoric acid and calcium sulfate. In accordance with condition and the number of crystalline water in produced calcium sulfate, the wet-processes are classified as dihydrate, hemihydrate, anhydrous, hemi-dihydrate and di-hemihadrate process. Among them, the anhydrous process can't be industrialized by now, and hemihydrate process is used seldom because of its severe operation. Now, the dihydrate process is the main one for preparing phosphoric acid. The production by such process is up to 80% or more of total production of phosphoric acid, and the scale of its apparatus becomes larger and larger. However, dihydrate process has two shortages: one is the co-crystallation of $CaHPO_4$ in the gypsum crystal lattice, and thereby the loss of $P_2O_5$ is high and recovery efficiency is low; the other is that the concentration of phosphoric acid is low and only about 30%. Now in China, the dihydrate process is dominant, and hemihydrate or hemi-dihydrate process takes second place, and di-hemihadrate process has not been reported.

DISCLOSURE OF THE INVENTION

The purpose of the invention is providing a method of preparing wet process phosphoric acid. The process is subjected to dihydrate-hemihydrate process. By such process, the high concentration phosphoric acid is made from lower class phosphate rock, and a good quality low-phosphorous apatite is obtained to satisfy requirement of producing sulfuric acid and cement.

The resolution of the present invention comprises that: dividing raw materials which contain phosphate rock slurry and sulfuric acid into two parts; then, the one of these two parts directly flows into conversion cell, and participates in the conversion reaction of dihydrate gypsum. The process comprises:

1. In the first reactor 1, feeding phosphate rock slurry, sulfuric acid, and recycled low-concentration phosphoric acid 9 from filter 6; the weight ratio of phosphate rock slurry to sulfuric acid to recycled low-concentration phosphoric acid is 1:(0.6~0.8):(1.0~2.5); the molar ratio of phosphate rock slurry to sulfuric acid is 1:5; in the first reactor, feeding amount of the slurry and sulfuric acid is 70–90 wt. % of the total amount; the reaction temperature is controlled between 75–85° C.; the ratio of liquid to solid is 2.3–2.6; the concentration of $SO_3$ in the first reaction solution is 0.04–0.07 g/L; the concentration of $P_2O_5$ in the first reaction solution is 28–30%.
2. In the second reactor 2, feeding the first reaction solution and the other part of the phosphate rock slurry and sulfuric acid; making all of them to react completely; in the second reactor, the reaction temperature is controlled between 70–80° C.; the ratio of liquid to solid is 2.3–2.7; the concentration of $SO_3$ in the second reaction solution is 0.03–0.05 g/L; the concentration of $P_2O_5$ in the second reaction solution is 30–35%.
3. Dividing the second reaction solution into two parts. Part 8, which contains 10~30% of the reaction solution, flows into conversion cell 4; the other part 7 flows into separator 5, where the product phosphoric acid is extracted; the resulted concentration of phosphoric acid is 33~39 wt. %.
4. In conversion cell 4, feeding the dihydrate gypsum 10 separated by separator, the part 8 of second reaction slurry from the second reactor and some additional sulfuric acid, which conduct the conversion reaction by introducing steam; the amount of added sulfuric acid is 0–15% of the feeding amount of the sulfuric acid in the first reactor; in the conversion cell, the reaction temperature is controlled between 90–105° C.; the ratio of liquid to solid is 2.5–3; the concentration of $SO_3$ in reaction solution is 0.07–0.09 g/L; the concentration of $P_2O_5$ in reaction solution is 24–30%.
5. In filter 6, filtering the conversion solution; feeding the filtrate 9 (the concentration of $P_2O_5$ is 24–30%) back into the first reactor. The filter cake is crude hemihydrate gypsum, which contains 4–8% of crystalline water and 18–20% of adsorptive water. The crude gypsum can be converted naturally into dihydrate gypsum through hydrolyzation, which contains only 5–10% of adsorptive water; the product can be used for producing sulfuric acid and cement, as well as making plasterboard and other building materials.

The present invention is characterized in dividing phosphate rock slurry and sulfuric acid into two parts and then feeding these two parts into two reactors separately. In the first reactor, feeding 70–90 wt. % of the total amount of the slurry and sulfuric acid makes it possible to control the concentration of $P_2O_5$ in lower level and to maximize concentration of free sulfuric acid in order to obtain the better crystallization condition and to reduce the loss of $P_2O_5$ because of the co-crystallation. In the second reactor, feeding additional phosphate rock slurry and sulfuric acid make it possible to control concentration of $P_2O_5$ in higher level (up to 30–35%) and to obtain the better condition for the crystallization of gypsum. In this way, the resulted gypsum crystals are big, uniform, which facilitates the filtration. As a result, the loss of $P_2O_5$ due to co-crystallation and the loss of water-solubility $P_2O_5$ are reduced; the amount of undecomposed $P_2O_5$ is decreased; the yield of $P_2O_5$ is increased. Thus, the high concentration phosphoric acid can be produced by using middle class phosphate rock.

The present invention is also characterized in that one part of the reaction solution obtained in the second reactor directly flows into conversion cell, and participates in the conversion reaction of dihydrate gypsum separated by separator. In this step, according to the situation, feeding additional sulfuric acid maintains the higher concentration of sulfuric acid and phosphoric acid in the solution of the conversion cell. This can promote the conversion process and the growth of hemihydrate gypsum crystal, as well as prevent hemihydrate gypsum from "excess dehydration".

In present invention for preparing phosphoric acid, a filtration-supporting cell 5 can be added between the conversion cell 4 and filter 6. In other words, a filtration-supporting step is added to the process. In the filtration-supporting cell 5, the coke powder and the conversion solution from conversion cell are fed. The ratio of added coke powder to gypsum is 1:16–30. The mixture is fed into the filter 6 to carry out following filtrate step. The porous coke powder can absorb the fluorosilicic acid in the solution, so that the filtration speed of hemihydrate gypsum can be increased and the filtration efficiency can be improved by 10–30%.

BRIEF DESCRIPTION OF THE DRAWINGS

The FIGURE is a schematic diagram of the process for preparing phosphoric acid.

Please refer to the FIGURE. In the first reactor 1, phosphate rock slurry, sulfuric acid, and recycled low-concentration phosphoric acid 9 from filter 6 are fed to be decomposed for 1.5–2 hours; feeding amount of the phosphate rock slurry and sulfuric acid is about 80 wt. % of their total feeding amount in the present process. In the second reactor, feeding the first reaction solution and the rest of the phosphate rock slurry and sulfuric acid makes the reaction complete; the reaction is carried out for 1.5–2 hours; feeding amount of the phosphate rock slurry and sulfuric acid in the second reactor is about 20 wt. % of their total amount. Dividing the reaction solution obtained in the second reactor into two parts, among which part 8 flows into conversion cell 4, and the other part 7 flows into separator 3 to produce phosphoric acid in which the concentration of $P_2O_5$ is 33~39 wt. %. In conversion cell 4, the dihydrate gypsum 10 separated from separator 3 is mixed with part 8 of second reaction slurry from the second reactor. Some additional sulfuric acid is added according to the situation. In the conversion cell 4, dihydrate gypsum is transformed into hemihydrate gypsum; the conversion reaction carries out for 40–60 minutes. In filter 6, after filtering the conversion solution, the filtrate which contains 24–30% of $P_2O_5$ is fed into the first reactor. The filter cake is hemihydrate, which contains 4–8% of crystalline water, 18–20% of adsorptive water and 0.05–0.2% of $P_2O_5$; the product can be used for producing sulfuric acid and cement, as well as making plasterboard and other building material.

Preferred Embodiments of the Invention

EXAMPLE 1

1. In the first reactor, feeding phosphate rock slurry, sulfuric acid, and recycled low-concentration phosphoric acid with 27.1% of $P_2O_5$ from filter to conduct decomposition reaction; their weight ratio is 1:0.75:1.6; the molar ratio of phosphate rock slurry to sulfuric acid is 1:5; in the first reactor, feeding amount of the slurry and that of the sulfuric acid is respectively 71 and 72 wt. % of their total feeding amount in the process; the reaction temperature is controlled at 79° C.; the ratio of liquid to solid is 2.55; the concentration of $SO_3$ in reaction solution is 0.064 g/L; the reaction time is 1.8 hour; the concentration of $P_2O_5$ in reaction solution is 28.9%.
2. In the second reactor, feeding the first reaction solution and the other 29% of phosphate rock slurry and 28% of sulfuric acid; making reaction complete; in the second reactor, the reaction temperature is controlled at 74° C.; the ratio of liquid to solid is 2.59; the concentration of $SO_3$ in reaction solution is 0.038 g/L; the reaction time is 1.6 hour; the concentration of $P_2O_5$ in reaction solution is 33.1%.
3. Dividing the reaction solution obtained in the second reactor into two parts, 28% of obtained reaction solution flows into conversion cell, and the rest flows into separator, where the product phosphoric acid is extracted to obtain phosphoric acid in which the concentration of $P_2O_5$ is 37.14 wt. %.
4. In conversion cell, feeding the dihydrate gypsum separated from separator, the second reaction slurry from the second reactor and some additional sulfuric acid, which conduct the conversion reaction by introducing steam; the amount of added sulfuric acid is 11% of the feeding amount of the sulfuric acid in the first reactor; in the conversion cell, the reaction temperature is controlled at 96° C.; the ratio of liquid to solid is 2.77; the concentration of $SO_3$ in reaction solution is 0.079 g/L; the reaction time is 54 minutes; the concentration of $P_2O_5$ in reaction solution is 27.4%.
5. In the filtration-supporting cell, feeding the conversion solution from conversion cell and the coke powder, and making the ratio of the coke powder to the conversion solution be 1:21; feeding the mixture into the filter to be filtrated. In filter, after filtration, the filtrate ($P_2O_5$ 27.1%) is fed into the first reactor, and the filter cake is crude hemihydrate gypsum, which contains 6.78% of crystalline water and 19.16% of adsorptive water. The amount of $P_2O_5$ in the hemihydrate gypsum is 0.13% and the recovery efficiency of $P_2O_5$ is 99.1%. The crude gypsum can be converted into dihydrate gypsum naturally through hydrolyzation, which contains only 6.81% of adsorptive water; the product can be used for producing sulfuric acid and cement, as well as making plasterboard and other building materials.

EXAMPLE 2

1. In the first reactor, feeding phosphate rock slurry, sulfuric acid, and recycled low-concentration phosphoric acid with 27.9% $P_2O_5$ from filter; their weight ratio is 1:0.68:1.4; the molar ratio of phosphate rock slurry to sulfuric acid is 1:5; in the first reactor, feeding amount of the slurry and that of sulfuric acid is respectively 78 and 80 wt. % of their total amount; the reaction temperature is controlled at 83° C.; the ratio of liquid to solid is 2.41; the concentration of $SO_3$ in reaction solution is 0.053 g/L; the reaction time is 2 hour; the concentration of $P_2O_5$ in reaction solution is 29.1%.
2. In the second reactor, feeding the first reaction solution and the other 22% of phosphate rock slurry and 20% of sulfuric acid; making reaction complete; in the second reactor, the reaction temperature is controlled at 78° C.; the ratio of liquid to solid is 2.57; the concentration of $SO_3$ in reaction solution is 0.031 g/L; the reaction time is 1.6 hour; the concentration of $P_2O_5$ in reaction solution is 34.3%.
3. Dividing the reaction solution obtained in the second reactor into two parts, 23% of obtained reaction solution flows into conversion cell, and the rest flows into separator, where the product phosphoric acid is extracted to obtain phosphoric acid, in which the concentration of $P_2O_5$ is 38.03 wt. %.
4. In conversion cell, feeding the dihydrate gypsum separated from separator and the second reaction slurry from the second reactor, which conduct the conversion reaction by introducing steam; in the conversion cell, the reaction temperature is controlled at 94° C.; the ratio of liquid to solid is 2.91; the concentration of $SO_3$ in reaction solution is 0.067 g/L; the reaction time is 1 hour; the concentration of $P_2O_5$ in reaction solution is 28.3%.

5. In filter, after filtering the conversion solution, the filtrate ($P_2O_5$ 27.9%) is fed into the first reactor, and the filter cake is crude hemihydrate gypsum, which contains 7.13% of crystalline water and 18.94% of adsorptive water. The amount of $P_2O_5$ in the hemihydrate gypsum is 0.08%, and the recovery efficiency of $P_2O_5$ is 99.4%; The crude gypsum can be converted into dihydrate gypsum naturally through hydrolyzation, which contains 6.58% of adsorptive water; the product can be used for producing sulfuric acid and cement, as well as making plasterboard and other building materials.

INDUSTRIAL APPICABILITY

The present invention relates to a process for preparing phosphoric acid, which comprises: dividing raw materials which contain phosphate rock slurry and sulfuric acid into two parts, then feeding these two parts into two reactors separately. Part of the reaction solution directly flows into conversion cell and participates in the conversion reaction of dihydrate gypsum. By such process, the recovery efficiency of $P_2O_5$ is improved and up to 99% or more. Meanwhile, good quality hemihydrate gypsum is obtained, in which $P_2O_5$ is 0.05~0.2%, water of hydration is 4~8%, and adsorptive water is about 19%. After naturally hydrating, the product can be used for producing sulfuric acid and cement without baking dry. The coke powder as filtration-supporting agent is added to the reaction solution, which improves the filtration efficiency and reduces energy consumption. The present invention has obvious advantage in the aspect of economy and society.

The invention claimed is:

1. A process for preparing phosphoric acid, which comprises: decomposing phosphate rock, separating the decomposed solution, converting the dihydrate gypsum and filtrating, is characterized in that, the process comprises the steps following:
   (1-1) in a first reactor (1), feeding phosphate rock slurry, sulfuric acid, and recycled low-concentration phosphoric acid (9) from a filter to conduct decomposition; and obtaining a first reaction solution; wherein the weight ratio of phosphate rock slurry to sulfuric acid to recycled low-concentration phosphoric acid is 1: (0.6–0.8): (1.0–2.5);
   (1-2) in a second reactor (2), feeding the first reaction solution obtained in step 1-1, and other phosphate rock slurry and sulfuric acid thereby making the reaction complete;
   (1-3) dividing the reaction solution obtained from the second reactor into two parts: one part (8) comprising 10–30% of the reaction solution flows into conversion cell (4), and the other (7) flows into a separator (3), wherein the product phosphoric acid is extracted;
   (1-4) in a conversion cell (4), feeding the dihydrate gypsum (10) separated out from the separator, some additional sulfuric acid and the one part (8) of the second reaction slurry from the second reactor to conduct the conversion reaction; and obtaining a conversion solution; and
   (1-5) in a filter (6), after filtering the conversion solution, feeding the filtrate (9) into the first reactor; wherein the filter cake is the crude low-concentration phosphoric acid hemihydrate gypsum useful for producing sulfuric acid and cement.

2. A process for preparing phosphoric acid in accordance with claim 1, is characterized in that, adding a filtration-supporting step between the step 1-4 and step 1-5; that is, feeding the conversion solution obtained in step 1-4 and coke powder into the filtration-supporting cell (5), wherein the ratio of added coke powder to gypsum is 1:16–30.

3. A process for preparing phosphoric acid in accordance with claim 1, is characterized in that, in step 1-1, feeding amount of sulfuric acid and the phosphate rock slurry is 70–90 wt. % of their total feeding amount in the process.

4. A process for preparing phosphoric acid in accordance with claim 1, is characterized in that, in step 1-4, feeding amount of sulfuric acid is 0–15 wt. % of feeding amount in step 1-1.

5. A process for preparing phosphoric acid in accordance with claim 1, is characterized in that, in step 1-1, the reaction temperature is controlled between 75–85° C.; the concentration of $P_2O_5$ in reaction solution is 28–30%; the concentration of $SO_3$ in reaction solution is 0.04–0.07 g/L.

6. A process for preparing phosphoric acid in accordance with claim 1, is characterized in that, in step 1-2, the reaction temperature is controlled between 75–85° C.; the concentration of $P_2O_5$ in reaction solution is 30–35%; the concentration of $SO_3$ in reaction solution is 0.03–0.05 g/L.

7. A process for preparing phosphoric acid in accordance with claim 1, is characterized in that, in step 1-4, the reaction temperature is controlled between 90–105° C.; the concentration of $SO_3$ in reaction solution is 0.07–0.09 g/L.

8. A process for preparing phosphoric acid in accordance with claim 1, is characterized in that, in step 1-5, the concentration of $P_2O_5$ in filtrate which is fed back to the first reactor is 24–30%.

* * * * *